March 14, 1944.   H. DIETRICH   2,344,030

STOCKING

Filed Aug. 21, 1941   3 Sheets-Sheet 1

Inventor:
HERBERT DIETRICH
BY
Richards & Geier
ATTORNEYS

March 14, 1944.     H. DIETRICH     2,344,030
STOCKING
Filed Aug. 21, 1941     3 Sheets-Sheet 2

Inventor:
HERBERT DIETRICH
BY
Richards & Geier
ATTORNEYS

March 14, 1944.   H. DIETRICH   2,344,030
STOCKING
Filed Aug. 21, 1941    3 Sheets-Sheet 3

Inventor:
HERBERT DIETRICH
BY
Richards & Geier
ATTORNEYS

Patented Mar. 14, 1944

2,344,030

UNITED STATES PATENT OFFICE 2,344,030

STOCKING

Herbert Dietrich, Meinersdorf in Erz Gebirge, Germany; vested in the Alien Property Custodian Application August 21, 1941, Serial No. 407,718
In Germany January 4, 1940

5 Claims. (Cl. 66—187)

This invention relates to a method of producing on a flat knitting frame a full-fashioned stocking having a French foot and a pouch heel comprising two heel portions in a single operation while work on the center portion is suspended during the knitting of the heel portions.

In the known methods pertaining to this particular art the wedge-shaped pieces forming each heel portion are knit one onto the other with the result that it requires a long time to produce both heel portions, because work on the heel portions has to wait until the leg is completely finished. Furthermore, the knitting of the foot comprising instep, sole portions and toe is considerably delayed, since the knitting of each wedge-shaped piece of the heel portions requires almost as much time as the production of an ordinary pocket heel portion so that, even if the heel portions of the pouch heel are made up of only two wedges each, operation on the foot will have to be postponed approximately twice as long as when ordinary pocket heel portions have to be worked onto the leg. This is particularly important in view of the fact that the heel portions of pouch heels often comprise more than two wedges or gussets for the purpose of producing a heel space as large as that of pocket heels.

It is the object of the invention to eliminate these disadvantages by providing a method according to which the wedges forming the two heel portions are produced on the section side by side and, at least partly, simultaneously with one another or with the leg in such manner that of every two wedges of a heel portion to be united the one lying on top in the finished stocking is knit from its upper edge and the one lying below from its lower edge and with its inner longitudinal edge facing the outside, the union of the wedges being effected by gradual transfer of the finished wedge to the edge needles of the developing wedge, or vice versa.

In this way not only the knitting frame is more economically utilized but it is also possible to knit a pouch heel in which the wales of all wedges of both heel portions extend in the same direction, i. e., in the direction of the longitudinal axis of the leg, so that the finished pouch heel externally resembles an ordinary pocket heel.

No novelty resides of course in working parts of a stocking produced on a flat knitting frame simultaneously side by side instead of one after the other to save time, and this applies also to the heels of stockings. In a known method for instance for producing a regular stocking with English foot one heel portion is knit with the leg and another one with the foot by gradually widening both side edges of the leg, prior to starting on the foot portions, in a corresponding number of courses to the extent required for the width of the heel, one of these enlargements forming then one of the heel portions. The connecting lower portion of the foot has at first the width of the end of the leg, but the following courses are gradually narrowed at both edges of the fabric until the regular width of the foot portion is attained, whereby outside of the lower foot portion the second heel portion is formed. The product obtained by the application of this known method is, however, not a stocking having a French foot, and work on the central portion is therefore not suspended during knitting of the heel portions. Furthermore, the heel of a stocking knit according to this method is not a pouch heel and has nothing to do with a heel each portion of which consists of a plurality of pieces knit side by side. The method does not disclose, moreover, that two wedges of a heel portion are knit in opposite direction to each other and that the wedge positioned below in the finished stocking has its inner longitudinal edge directed outwardly.

According to another known method the heel portions with their connecting foot portion are simultaneously produced by working immediately after completion of the leg with a number of courses required by the length of the heel to be made which is then shaped merely by narrowing. A stocking produced by this method has of course a French foot whose heel is, however, not a pouch heel and does not comprise a plurality of wedge-shaped pieces of which the one lying below in the finished stocking, in contradistinction to the superposed wedge, is worked from its lower edge and with outwardly directed inner longitudinal edge. According to this known method all the heel portions are worked transversely.

The connection of parts of a stocking, for instance of the heel portions with the sole portions, by gradual transfer of the finished portion to the edge needles of the developing portion, and vice versa, is old art of course, though this method has been applied hitherto only when heel portions had to be separately worked into an unfinished stocking made with the exception of the heel portions in one operation on a flat knitting frame. The production of such stockings requires therefore two operations instead of one operation as proposed by the invention, and the working in of the heel portions makes necessary the use of a separate heel machine besides the machine producing the stocking, since otherwise this latter machine would become too complicated.

The invention is illustrated by way of example in the accompanying drawings, in which Figures 1 to 5 show different steps of the method according to the invention;

Figure 6:
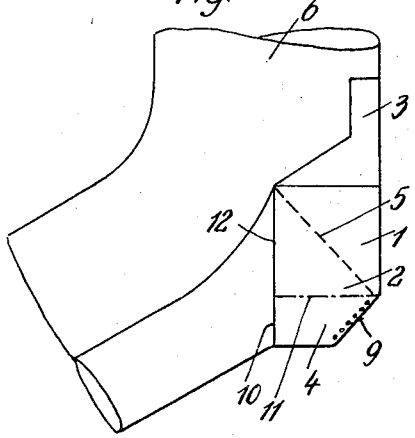
Fig. 6 shows part of a stocking having a heel produced according to the invention.
Figure 10:
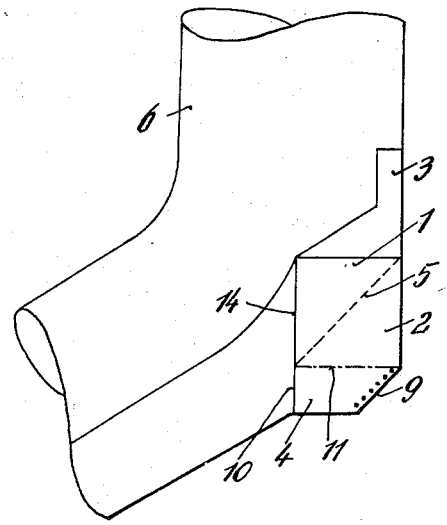
Fig. 10 shows part of a stocking having a heel worked according to this modified method.

The method according to the invention aims at producing a stocking having a pouch heel in which every heel portion comprises two wedge-shaped pieces 1, 2, referred to as "wedges" throughout the specification. The wedges 1, 2 have the form of approximately right-angled triangles united at their hypotenuses, and the wedges 2 have below an extension 4 forming the heel cap and being integral with the wedge 2. Figs. 6 and 10 show parts of two stockings fitted with such heels. The two stockings differ merely in so far as in the stocking shown in Fig. 6 the connection 5 of the two wedges 1, 2 extends from the heel angle toward the heel cap and in the stocking shown in Fig. 10 from the upper rear heel edge to the lower front heel edge. The wedges 1 and 2, 4 of each heel portion are produced side by side in such manner that the wedge 1 lying on top in the finished stocking is worked from its upper edge and the wedge 2, 4 lying below in the finished stocking is worked from its lower edge and with outwardly facing inner longitudinal edge.

Figure 1:
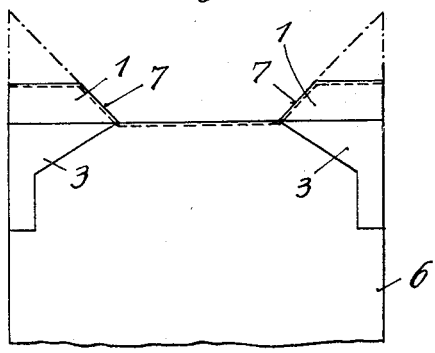
Figure 2:
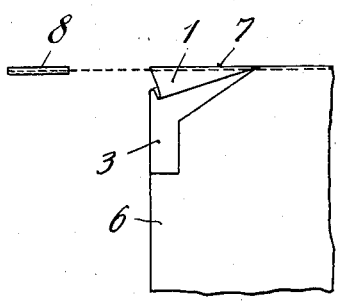
Figure 3:
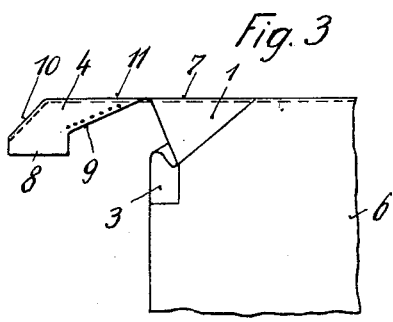

The method illustrated in Figs. 1 to 6 will now be described in detail. The leg 6 is first worked in the usual way up to the completion of the high heel portions 3, whereupon knitting of the central leg portion is interrupted in known manner. As indicated in Fig. 1, a piece of fabric 1 having the form of a right-angled triangle, or approximately so, is then worked onto each high heel portion 3, the hypotenusal edge 7 of these wedges 1 being held on the frame needles by omitting knocking over of the meshes concerned. During the production of the wedges 1 working of the heel cap portions 4 is begun, as shown in Fig. 2, which are knit at both sides of the leg 6 and started with the additional courses 8 begun when the wedges 1 have approximately been knit to a length indicated by solid lines in Fig. 1, the arrangement being such that the wedges 1 are completed simultaneously with the heel cap portions 4. This is necessary because the wedges 2 to be subsequently produced are to be united with the wedges 1 on the machine by covering, so that the wedges 1 must be completed prior to starting work on the wedges 2 which form continuations of the heel caps 4. As indicated by broken lines in Fig. 1, knitting of the wedges 1 is of course continued down to the formation of a point, but this is done while the caps 4 are being made. The caps 4, as shown in Fig. 3, are knit with an inwardly directed outer longitudinal edge 9 and, being worked from the additional courses 8, are upwardly enlarged by widening the fabric at the outer longitudinal edges 9.

Figure 4:
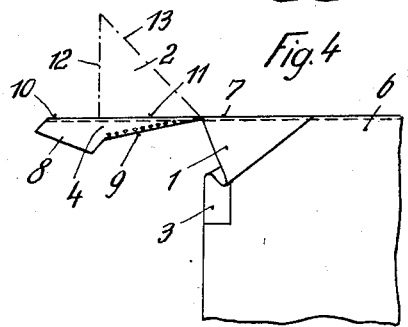
Figure 5:
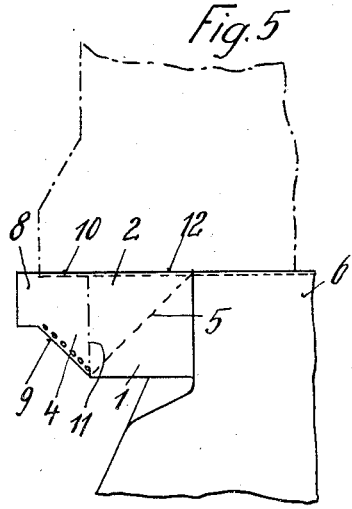
Figure 11:
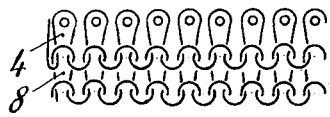
Figs. 11 to 21 illustrate details.
Figure 12:
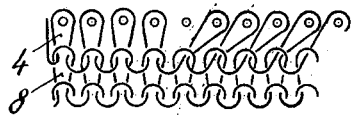
Figure 13:
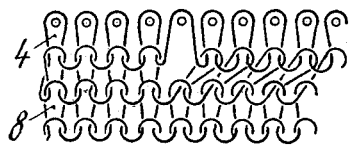

During the production of the cap portions 4 the procedure is such that the outwardly directed inner longitudinal edge 10 is held on the needles near the last course 11 of the cap portion 4 by omitting casting off of the edge meshes concerned and constantly transferring the inner part of the finished portion of the cap members 4 to the inside, as indicated in Fig. 4. How the outwardly directed inner longitudinal edge 10 of the cap portions 4 is held on the needles will be seen by looking at Figs. 11 to 18. Fig. 11 shows how the first course of a cap portion 4 is worked onto the last course of the left additional course 8, whereupon the meshes of this course, beginning for instance with the fifth mesh, are transferred one needle to the right, as shown in Fig. 12. When this has been done, the second course of the cap portion 4 is knit as shown in Fig. 13, the path of the thread guide being extended only to the right in view of the transfer of the meshes of the previously worked course. Reduction of the path on the left side to the extent of the one needle over which the meshes of the first course of the cap portions 4 have been transferred to the right is thus omitted, since on an ordinary flat knitting frame equipped with jack and dividing sinkers groups of meshes may be transferred one needle but the path of the thread guide can always be displaced only to the extent of two needles. In view of these facts the extension of the path of the thread guide on the right side during the production of this second course amounts to two needles and not only to one needle, which is necessary anyhow, as the inwardly directed outer longitudinal edge 9 of the cap portions 4 has to be widened.

Figure 14:
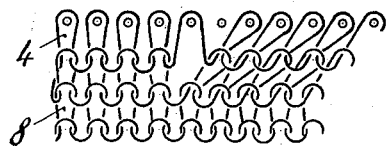
Figure 15:
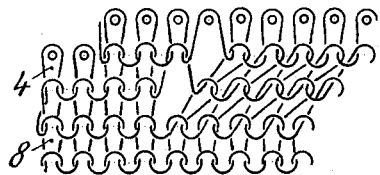
Figure 16:
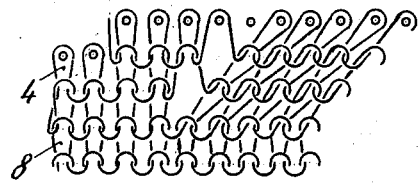
Figure 17:
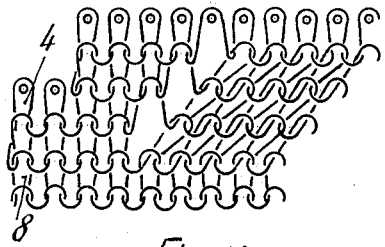
Figure 18:
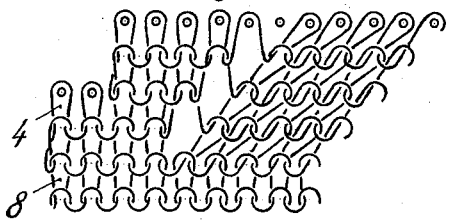

During the formation of the second course of the cap portion 4, Fig. 13, a loop instead of a mesh is produced on the needle freed by transferring. As shown in Fig. 14, this second course of the cap portion 4 is also partly transferred, and the transferring member starts at the position which it has occupied after the transfer of the first course of the cap portion 4, so that the four border meshes and the loop of the left side of this second course are not transferred. The two outer meshes of the left side, unlike all other meshes, are not knocked over but remain on their needles. The next step indicated in Fig. 15 consists in shortening the path of the thread guide on the left side to the extent of two needles and then knitting the third course of the cap portion 4. On the fourth needle from the left this course has again a loop instead of a mesh. From its position occupied after transferring the second course the transfer member transfers the meshes to the right of the loop one needle to the right, Fig. 16, whereupon the fourth course is worked, Fig. 17. As in the second course, the path of the thread guide on the left side remains the same as in the third course but is extended on the right side. All meshes of this fourth course positioned to the right of the loop are transferred again one needle to the right, Fig. 18, and the two extreme meshes of the left side are not knocked over, whereupon the cycle of operations shown in Fig. 15 with respect to the third course is repeated.

If the method according to the invention is carried out on a so-called "single sinker frame," the path of the thread guide on the left side may be shortened in each course and only to the extent of one needle. Care is to be taken that after completion of the cap portions 4 the inner corner thereof coincides with the outer corner of the wedges 1. Onto the last course 11 of the cap portion 4 the wedge 2 is then knit which corresponds to the first worked wedge 1 and also tapers off toward the outside, as indicated by dots and dashes in Fig. 4. The outer longitudinal edge 12 of the wedge 2 is held on the needles by omitting knocking over of the corresponding border meshes thereof and continually transferring the inner part of the finished portion of the wedge 2 toward the inside. Exactly as in the production of the cap portions 4, the path of the thread guide, according to Figs. 11 to 18, is shortened two needles every two courses on the edge 12. Furthermore, apart from a certain number of border meshes of the outer longitudinal edge 12, the meshes of each finished course are inwardly transferred to the extent of one needle, and the two extreme meshes of the edge 12 are not knocked over every two courses. The hypotenusal edge 13 of the wedge 2 is then united with the hypotenusal edge 7 of the wedge 1 by the continual inward transfer of the finished portion of the wedge 2 together with the cap portion 4 on the adjacent needles so as gradually to place the inner meshes of the edge 13 of the developing wedge 2 on the needles holding the edge 7 of the wedge 1.

Figure 19:
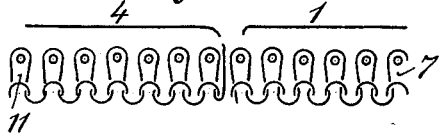
Figure 20:
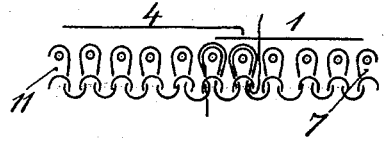
Figure 21:
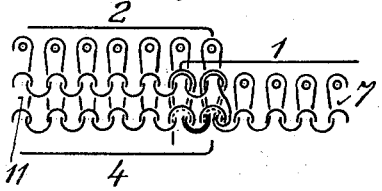

These needles are then gradually employed in the mesh forming process of which details are shown in Figs. 19 to 21. In Fig. 19 it is assumed that the cap portions 4 have just been completed, the left cap portion 4 being for instance with its last course 11 outside on the needles adjoining the needles which hold the last course 7 of the left wedge 1. Prior to starting the first course of the left wedge 2, the cap portions 4 are for instance inwardly transferred two needles by a transferring member, so that in this way the two innermost meshes of the last course 11 of the cap portions 4 are placed on the needles holding the two extreme meshes of the last course 7 of the wedges 1, as shown in Fig. 20. According to Fig. 21, the first course of the wedges 2 is then knit onto the cap portions 4, and this transfer is repeated during the working of every other course of the wedges 2. It is possible of course to inwardly transfer the wedges 2 to the extent of one needle in each course during their formation, but a better union of the two wedges 1, 2 is effected if the junctions are two meshes wide. After completion of the wedges 2 the heel portion comprising the wedges 1, 2 and a cap portion 4 hangs on the needles near the middle portion of the leg 6, Fig. 5, and onto the longitudinal edge 12 of the wedge 2 and the longitudinal edge 10 of the cap portion 4 the sole portion can be worked laterally of the instep, as it well known and also shown in Fig. 5.

Figure 7:
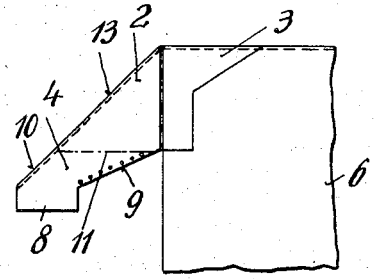
Figs. 7 to 9 show different steps of a modified method.
Figure 8:
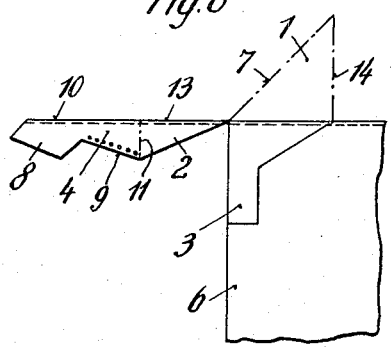
Figure 9:
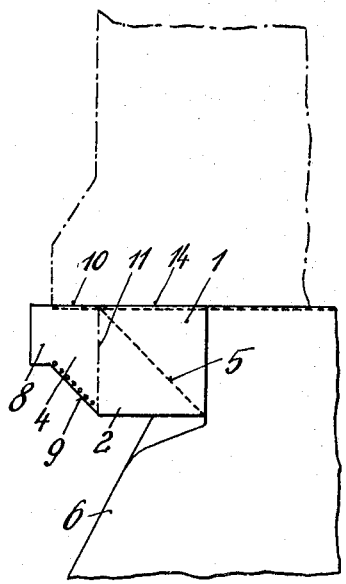

The method illustrated in Figs. 7 to 10 is applied as follows:

Before the leg 6 has been worked to the high heel portions 3, as indicated in Fig. 7, on both sides thereof the heel cap portion 4 with the additional courses 8 and the wedge 2 are knit in one piece, so that after completion of the wedge 2 the leg 6 with the high heel portions 3 is finished. As in the previously described method, the cap portion 4 is produced by holding the outwardly directed inner longitudinal edge 10 thereof near the last course 11 of the cap on the needles by omitting knocking over of the respective border meshes and continually transferring the inner portion of the finished part of the cap portion 4 in the manner shown in Figs. 11 to 18. The result is shown in Fig. 4. To the last course 11 of the cap portion 4 the wedge 2 is then knit in the production of which the procedure is such that the hypotenusal edge 13 is held inside near the outwardly directed inner longitudinal edge 10 of the cap portion 4 on the needles of the frame, as shown in Fig. 8. This is effected simply by omitting knocking over of the respective border meshes of the edge 13 and corresponding shortening of the travel of the thread guide in the manner referred to in the previously described method during the production of the wedges 1 with respect to the edge 7. Thereupon the wedge 1 is knit onto the high heel portion 3, as indicated by dots and dashes in Fig. 8, by placing the inner longitudinal edge 14 of the wedge 1 on the needles previously holding the high heel portions 3 and working the edge 7 of the wedge 1 onto the edge 13 of the wedge 2. The first part of this operation is performed by omitting knocking over of the respective border meshes of the inner edge 14 and continually transferring the outer portion of the finished part of the member 1 in outward direction, so that the edge 14 is finally held by the needles of the high heel portion 3. The steps are the same as those mentioned in the description of the first method with respect to the production of the wedges 2 and are illustrated, with reference to the cap portions 4, in Figs. 11 to 18. In the second part of the operation involving the working together of the edges 7 and 13 the first worked wedge 2 with its cap portion 4 is continually transferred in inward direction corresponding to the production of the wedge 1. The mode of operation fundamentally resembles that employed in working together the wedges 1, 2 according to the previously described method and as shown in Figs. 19 to 21, with the difference, however, that not the wedge 2 but the wedge 1 is being produced and for this purpose the already finished wedge 2 with its cap portion 4 is continually inwardly transferred. When the wedges 1 are completed, the inner longitudinal edge 14 thereof is positioned on the needles laterally of the middle portion of the leg 6 and near the inner longitudinal edge 10 of the cap portion 4, as shown in Fig. 9, whereupon the foot can be worked on. In the two heel portions of the finished stocking produced in conformity with either method the weals always extend in the direction of the longitudinal axis of the leg.

The method according to the invention may be varied in details by knitting for instance the cap portions 4 without additional courses 8 and starting them instead thereof with a close initial course.

The method according to the invention can be performed on any machine provided with a Jacquard, lace and Jacquard tuck pattern attachment and also on those machines whose lace and tuck pattern attachment covers only the sides of the sections. Furthermore, machines with travelling presser bar and narrowers with diamond blade-like members are also suited for the purpose if these parts are correspondingly dimensioned and moved.

I claim:

1. Method of producing on a flat knitting frame in a single operation a full-fashioned stocking having a French foot and a pouch heel comprising two heel portions while work on the center portion is suspended during the knitting of the heel portions, consisting in producing the wedges forming the two heel portions on the section side by side and, at least partly, simultaneously in such manner that of every two wedges of a heel portion to be united the one lying on top in the finished stocking is knit from its upper edge and the one lying below from its lower edge and with its inner longitudinal edge facing the outside, and effecting the union of the two wedges by gradually transferring one of the two wedges to one other wedge.

2. The method according to claim 1, in which onto the wedge lying below in the finished stocking an extension forming the heel cap is knit, also from its lower edge, and in one piece with this wedge.

3. The method according to claim 1, consisting in knitting onto each of the finished high heel portions while work on the middle portion is suspended a piece of fabric having the form of an outwardly tapering approximately right-angled triangle whose hypotenusal edge is held on the frame needles by omitting knocking over of the respective border meshes, simultaneously knitting laterally of the leg the heel caps from their lower edge up with inwardly directed outer longitudinal edge, holding the outwardly directed inner longitudinal edge of said caps outside near the last course thereof on the needles by omitting knocking over of the respective border meshes and continually transferring the inner part of the finished portion of said caps in inward direction, knitting onto this last course of each of said caps a piece of fabric corresponding to the triangular pieces worked onto the high heel portions and having the form of an outwardly tapering approximately right-angled triangle whose outer longitudinal edge is held on the needles by omitting knocking over of the respective border meshes and continually transferring the inner part of the finished portion of said triangular pieces in inward direction, separately and continually transferring the finished portions of these last-worked triangular pieces together with the cap portions hanging on the adjacent needles for the purpose of gradually placing the inner meshes of the hypotenusal edge of these last-worked pieces on the needles holding the hypotenusal edge of the first-worked triangular pieces and gradually employing said needles in looping operations for working together the hypotenusal edges of said two triangular pieces.

4. The method as claimed in claim 1, consisting in working laterally of the leg and simultaneously therewith the heel cap portions with inwardly directed outer longitudinal edge from their lower edge up, holding on the needles the outwardly directed inner longitudinal edge of said portions outside near the last course thereof by omitting knocking over of the respective border meshes and continually transferring the inner parts of the finished portions of said caps in inward direction, knitting onto the last course of each of said cap portions a piece of fabric having the form of an inwardly tapering approximately right-angled triangle whose hypotenusal edge is held on the needles inside near the cap portions by omitting knocking over of the respective border meshes, working onto each high heel portion a piece of fabric resembling the first-worked triangular pieces and having the form of an inwardly tapering approximately right-angled triangle whose inner longitudinal edge is held on the needles by omitting knocking over of the respective border meshes and continually transferring the outer part of the finished portion of said triangular pieces in outward direction and working together the hypotenusal edge of said last-worked triangular pieces and the hypotenusal edge of said first-worked pieces by continually inwardly transferring said first-knit pieces with their cap portions in accordance with the production of the triangular pieces hanging on the high heel portions.

5. The method as claimed in claim 1, in which the heel cap portions are knit without additional courses but with a close initial edge.

HERBERT DIETRICH.